(12) United States Patent
Ooki et al.

(10) Patent No.: US 9,821,648 B2
(45) Date of Patent: Nov. 21, 2017

(54) HYBRID VEHICLE DRIVE DEVICE

(71) Applicant: Nissan Motor Co., Ltd., Yokohama-shi, Kanagawa (JP)

(72) Inventors: Shinjiro Ooki, Isehara (JP); Takayuki Okuda, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 283 days.

(21) Appl. No.: 14/646,741

(22) PCT Filed: Nov. 13, 2013

(86) PCT No.: PCT/JP2013/080680
§ 371 (c)(1),
(2) Date: May 22, 2015

(87) PCT Pub. No.: WO2014/097780
PCT Pub. Date: Jun. 26, 2014

(65) Prior Publication Data
US 2015/0306949 A1 Oct. 29, 2015

(30) Foreign Application Priority Data
Dec. 21, 2012 (JP) .................................. 2012-278940

(51) Int. Cl.
*B60K 6/48* (2007.10)
*B60K 6/40* (2007.10)
(Continued)

(52) U.S. Cl.
CPC ................... *B60K 6/48* (2013.01); *B60K 6/36* (2013.01); *B60K 6/40* (2013.01); *B60K 6/405* (2013.01);
(Continued)

(58) Field of Classification Search
CPC .......... B60K 6/48; B60K 17/02; B60K 6/405; B60K 6/36; B60K 6/40; B60K 17/04;
(Continued)

(56) References Cited

U.S. PATENT DOCUMENTS 6,346,062 B1  2/2002  Shimabukuro et al.

FOREIGN PATENT DOCUMENTS

| EP | 2 447 574 A1 | 5/2012 |
|----|---|---|
| JP | 2000-199442 A | 7/2000 |

(Continued)

*Primary Examiner* — Victor Macarthur
(74) *Attorney, Agent, or Firm* — Global IP Counselors, LLP

(57) ABSTRACT

A hybrid vehicle drive device includes a power transmission mechanism including a transmission coupled to an engine output shaft, a clutch coupled to a transmission output shaft, a first gear coupled to a clutch output shaft, a final reduction gear that constantly meshes with the first gear, a drive shaft coupled to the final reduction gear, a first rotary element coupled to an electric motor, and a second rotary element that meshes with the final reduction gear and rotates in accordance with the rotation of the rotary element. The power transmission mechanism is disposed so that, when viewed from the rotational axis direction of each gear, a line that connects the rotational axis of the first rotary element and the rotational axis of the second rotary element is inclined to the first gear side in relation to the vertical direction of the vehicle when mounted to a vehicle.

10 Claims, 3 Drawing Sheets

(51) Int. Cl.
  *B60K 6/543*    (2007.10)
  *B60K 17/04*   (2006.01)
  *F16H 57/04*   (2010.01)
  *B60K 6/36*    (2007.10)
  *B60K 6/405*   (2007.10)
  *B60K 17/02*   (2006.01)

(52) U.S. Cl.
  CPC ............. *B60K 6/543* (2013.01); *B60K 17/02* (2013.01); *B60K 17/04* (2013.01); *F16H 57/0457* (2013.01); *F16H 57/0489* (2013.01); *F16H 57/0495* (2013.01); *B60K 2006/4808* (2013.01); *Y02T 10/626* (2013.01); *Y02T 10/6221* (2013.01); *Y10S 903/909* (2013.01); *Y10S 903/918* (2013.01); *Y10S 903/951* (2013.01)

(58) Field of Classification Search
  CPC ............ B60K 6/543; B60K 2006/4808; F16H 57/0489; F16H 57/0495; F16H 57/0457; Y10S 903/951; Y10S 903/909; Y10S 903/918; Y02T 10/626
  See application file for complete search history.

(56) References Cited

FOREIGN PATENT DOCUMENTS

| | | |
|---|---|---|
| JP | 3584680 B2 | 8/2004 |
| JP | 2007-22112 A | 2/2007 |
| JP | 2008-239126 A | 10/2008 |
| JP | 2012-56366 A | 3/2012 |

HYBRID VEHICLE DRIVE DEVICE

CROSS-REFERENCE TO RELATED APPLICATIONS

This application is a U.S. National stage application of International Application No. PCT/JP2013/080680, filed Nov. 13, 2013, which claims priority to JP Patent Application No. 2012-278940 filed on Dec. 21, 2012, the contents of each of which are hereby incorporated herein by reference.

BACKGROUND

Field of the Invention

The present invention relates to a hybrid vehicle drive device equipped with an engine and an electric motor.

Background Technology

For example, a hybrid vehicle drive device such as that disclosed in JP Patent No. 3,584,680 has been known. In this vehicle, a first electric motor 10 is coupled to an output shaft 17a via an electric motor transmission 17. The electric motor transmission 17 is configured by planetary gears, and the first electric motor 10, the output shaft 17a, and the electric motor transmission 17 are arranged in one row in the axial direction.

SUMMARY

Since the lubrication of the electric motor transmission 17 has not considered, evaluating a configuration to secure a lubricant was necessary.

In view of the problem described above, an object of the present invention is to provide a hybrid vehicle drive device that is able to secure lubrication.

For this purpose, the hybrid vehicle drive device of the present invention comprises a power transmission mechanism comprising: a transmission that is coupled to an output shaft of an engine; a clutch that is coupled to an output shaft of the transmission; a first gear coupled to a clutch output shaft of the clutch; a final reduction gear that constantly meshes with the first gear; a drive shaft that is coupled to the final reduction gear; a first rotary element that is coupled to an electric motor; and a second rotary element that meshes with the final reduction gear and rotates in accordance with the rotation of the first rotary element. The power transmission mechanism is disposed so that, when viewed from the rotational axis direction of each gear, a line that connects the rotational axis of the first rotary element and the rotational axis of the second rotary element is inclined to the first gear side in relation to the vertical direction of the vehicle when mounted to a vehicle.

In other words, supplying lubricant that is scraped up by the final reduction gear to the power transmission mechanism becomes possible by constantly meshing the first gear and the power transmission mechanism with the final reduction gear. Since the lubricant that is supplied to the power transmission mechanism is also supplied to the first gear by inclining a line that connects the rotational axis of the first rotary element and the rotational axis of the second rotary element to the first gear side, lubricating both the first gear and the power transmission mechanism is possible.

BRIEF DESCRIPTION OF DRAWINGS

Referring now to the attached drawings which form a part of this original disclosure.

DETAILED DESCRIPTION OF EMBODIMENTS

First Embodiment

Figure 1:
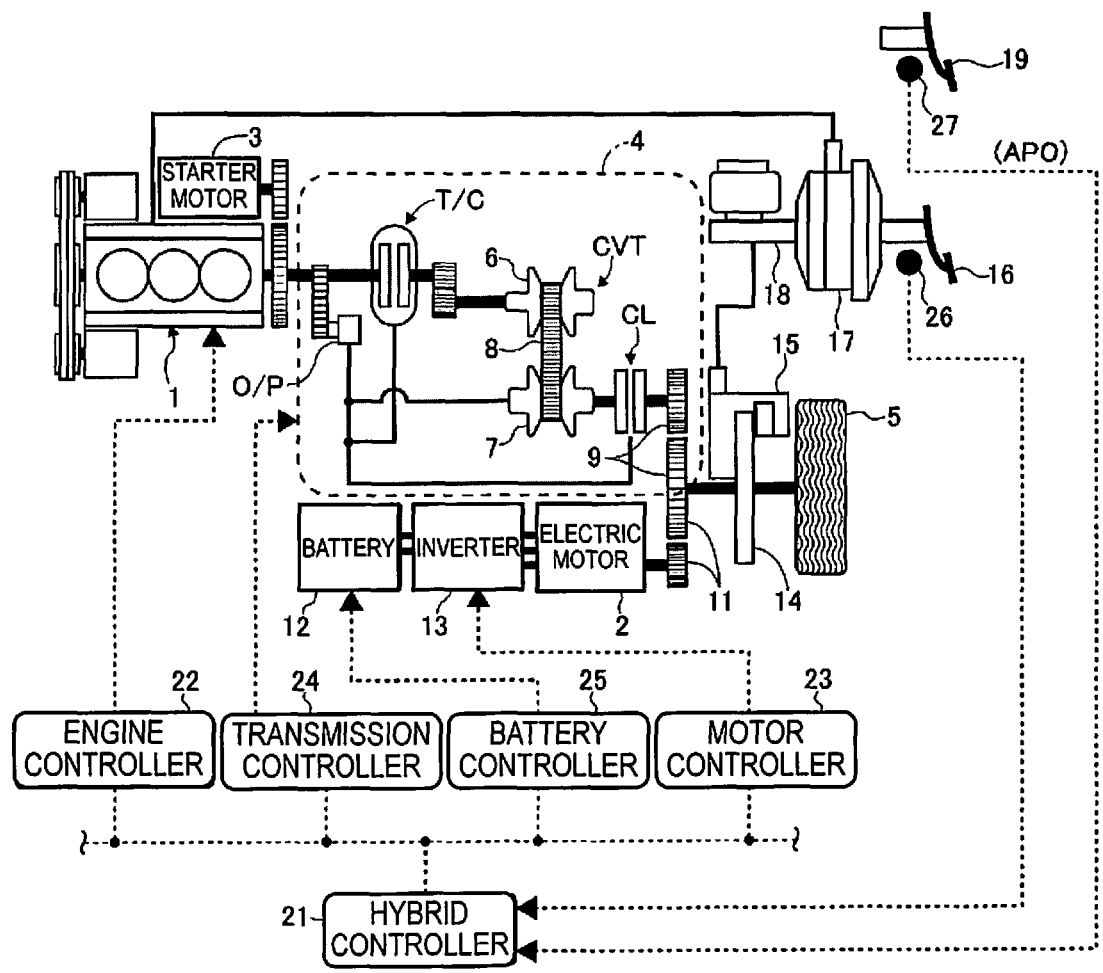
FIG. 1 is a schematic system view illustrating the drive system of the hybrid vehicle drive device and the overall control system thereof of the first embodiment.

FIG. 1 is a schematic system view illustrating the drive system of the hybrid vehicle drive device and the overall control system thereof of the first embodiment. The hybrid vehicle of FIG. 1 is equipped with an engine 1 and an electric motor 2 as the power source, and the engine 1 is started by a starter motor 3. The engine 1 is coupled in a drivable manner to drive wheels 5 via a V-belt-type continuously variable transmission 4 that is capable of being appropriately detachable.

The continuously variable transmission 4 is a continuously variable transmission CVT that is configured from a primary pulley 6, a secondary pulley 7, and a V-belt 8 that bridges these pulleys 6, 7. The primary pulley 6 is coupled to a crankshaft, which is an output shaft of the engine 1 via a torque converter T/C with a lockup clutch; the secondary pulley 7 is coupled to the drive wheels 5 sequentially via a clutch CL, a final gear set 9, and a differential mechanism 32 (refer to FIG. 2) of a final reduction gear device 30. Here, the final gear set 9 refers to the meshing between a first gear 9a that is coupled to an output shaft of the clutch CL and a final reduction gear 31 of the final reduction gear device 30.

Thus, in an engaged state of the clutch CL, power from the engine 1 is input into the primary pulley 6 via the torque converter T/C; power reaches the drive wheels 5 via the V-belt 8, the secondary pulley 7, the clutch CL, and the final gear set 9 sequentially; and, then, power is provided to the traveling hybrid vehicle.

An electric motor 2 is constantly coupled to the drive wheels 5 via a power transmission mechanism 11, and this electric motor 2 is driven via an inverter 13 by power from a battery 12. Here, the power transmission mechanism 11 refers to the meshing among a second gear 11a (a first rotary element) that is coupled to an output shaft of the electric motor 2, a third gear 11b that meshes with the second gear 11a, and a final reduction gear 31 that meshes with a fourth gear 11c (a second rotary element), the third gear 11b, and the final reduction gear 31.

The inverter 13 provides DC power from the battery 12 to the electric motor 2 after converting this power to AC power, and the drive force and the rotational direction of the electric motor 2 are controlled by adjusting the supplied power to the electric motor 2.

In addition to the driving motor described above, the electric motor 2 also functions as a generator, which is used in regenerative braking described below. During this regenerative braking, the inverter 13 causes the electric motor 2 to act as a generator by applying a generator load for regenerative braking to the electric motor 2, and the electric power generated by the electric motor 2 is stored in the battery 12.

In the hybrid vehicle of the first embodiment, only the power of the electric motor 2 reaches the drive wheels 5 via the power transmission mechanism 11 by driving the electric motor 2 in a state in which the clutch CL is released and the engine 1 is stopped in order to travel in an electric traveling mode (EV mode) with only the electric motor 2. During this time, the stopped engine 1 will not be dragged and rotated, and wasteful power consumption during EV traveling is suppressed by having the clutch CL released.

In the EV traveling state described above, if the clutch CL is engaged at the same time as starting the engine 1 with the starter motor 3, the power from the engine 1 will reach the drive wheels 5 sequentially via the torque converter T/C, the primary pulley 6, the V-belt 8, the secondary pulley 7, the clutch CL, and the final gear set 9; the hybrid vehicle will travel in a hybrid traveling mode (HEV mode) by the engine 1 and the electric motor 2.

To stop the hybrid vehicle from the above-described traveling state or to maintain this stopped state, the objective is achieved by clamping and braking a brake disk 14 that rotates with the drive wheels 5 with a caliper 15. The caliper 15 is connected to a master cylinder 18 that outputs a brake fluid pressure corresponding to the brake pedal stepping force under boost by a negative pressure-type brake booster 17 in response to the stepping force on a brake pedal 16, which a driver steps on, and braking the brake disk 14 is carried out by operating the caliper 15 with this brake fluid pressure. In both the EV mode and the HEV mode, the wheels 5 are driven by the torque corresponding to a drive force command, which is generated by the driver stepping on an accelerator pedal 19, and the hybrid vehicle is made to travel with a drive force corresponding to the needs of the driver.

The traveling mode selection of the hybrid vehicle, the output control of the engine 1, the rotational direction control of the electric motor 2, the shift control of the continuously variable transmission 4, the engagement and disengagement control of the clutch CL, and the charge/discharge control of the battery 12 are carried out by a hybrid controller 21. At this time, the hybrid controller 21 carries out these controls via a corresponding engine controller 22, a motor controller 23, a transmission controller 24, and a battery controller 25.

Accordingly, a signal from a brake switch 26, which is normally on and switches from OFF to ON when braking by stepping on the brake pedal 16, and a signal from an accelerator opening sensor 27, which detects the accelerator pedal depression amount (the accelerator opening) APO, are input into the hybrid controller 21. The hybrid controller 21 further exchanges internal information among the engine controller 22, the motor controller 23, the transmission controller 24, and the battery controller 25.

The engine controller 22 controls the output of the engine 1 in response to a command from the hybrid controller 21, and the motor controller 23 controls the rotational direction and the output of the electric motor 2 via the inverter 13 in response to a command from the hybrid controller 21. The transmission controller 24 controls the shifting of the continuously variable transmission 4 (the V-belt-type continuously variable transmission CVT) and the engagement/disengagement of the clutch CL with oil from an engine-driven oil pump O/P as a medium in response to a command from the hybrid controller 21. The battery controller 25 controls the charging/discharging of the battery 12 in response to a command from the hybrid controller 21.

Figure 2:
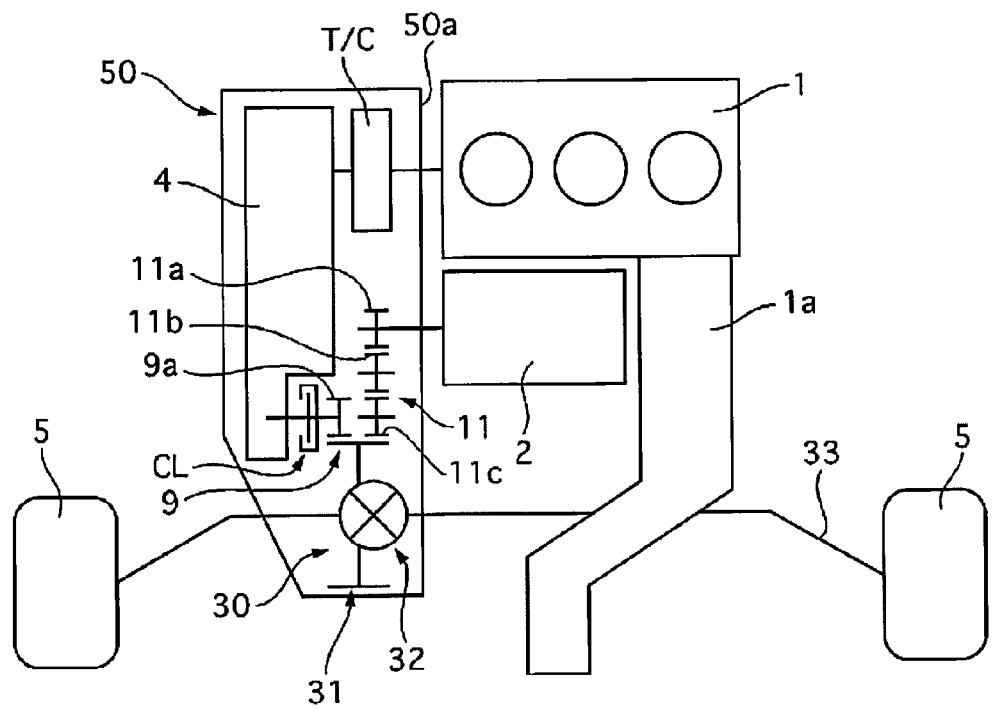
FIG. 2 is a schematic view showing the laid out configuration of the hybrid vehicle drive device of the first embodiment.

FIG. 2 is a schematic view showing the laid out configuration of the hybrid vehicle drive device of the first embodiment. The engine 1 and the electric motor 2 are disposed so that the crankshaft of the engine 1 and the rotating shaft of the electric motor 2 are parallel with each other, and both are mounted on a mounting surface 50a of a transaxle case 50. In other words, the engine 1 and the electric motor 2 are assembled so as to protrude from substantially the same plane of the mounting surface 50a. The torque converter T/C, the continuously variable transmission 4, the clutch CL, the first gear 9a, the final reduction gear device 30, and the power transmission mechanism 11 are housed in the transaxle case 50.

An engine exhaust pipe (or an intake pipe) 1a is provided to a portion on the opposite side of the mounting surface 50a side of the engine 1. A drive shaft 33 is coupled under the transaxle case 50. Thus, the electric motor 2 is provided in a region sandwiched between the drive shaft 33 and the engine 1 when viewed from the radial direction and in a region sandwiched between the mounting surface 50a and the engine exhaust pipe 1a when viewed from the axial direction.

Figure 3:
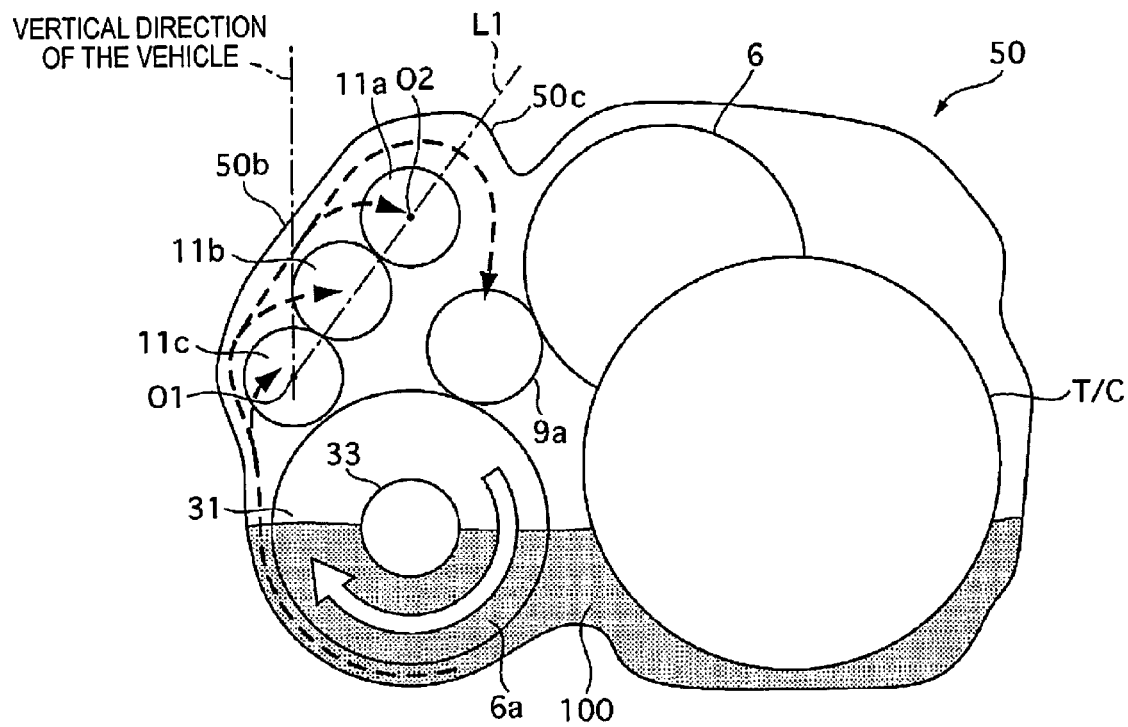
FIG. 3 is a schematic view of the hybrid vehicle drive device of the first embodiment in a vehicle-mounted state when viewed from the crankshaft side.

To facilitate the depiction in FIG. 2, the first gear 9a and the fourth gear 11c are shown as being side by side; however, in actuality, both the first gear 9a and the fourth gear 11c mesh with the final reduction gear 31 on the same plane in a direction perpendicular to the rotational axis of the final reduction gear 31, as depicted in FIG. 3.

FIG. 3 is a schematic view of the hybrid vehicle drive device of the first embodiment in a vehicle-mounted state when viewed from the crankshaft side. The power transmission mechanism 11 is configured by the second, third, and fourth gears 11a, 11b, 11c and is disposed so that the second gear 11a is positioned at a distance from the drive shaft 33. In other words, the inter-axial distance between the drive shaft 33 and the second gear 11a is disposed in such a way that the inter-axial distance between the drive shaft 33 and the first gear 9a is greater. The electric motor 2 is connected to the second gear 11a, the inter-axial distance between the rotating shaft of the electric motor 2 and the drive shaft 33 is secured, and the power transmission mechanism 11 allows the size of the outer diameter of the electric motor 2 to increase. A first inner wall 50b that is formed along the outer edge of the power transmission mechanism 11 is formed in the transaxle case 50, which houses the power transmission mechanism 11; additionally, a second inner wall 50c that curves toward the first gear 9a is formed above the second gear 11a, following the first inner wall 50b. An oil passage that is able to introduce lubricant between the power transmission mechanism 11 and the inner wall of the transaxle case 50 is formed by the first inner wall 50b and the second inner wall 50c.

Figure 4:
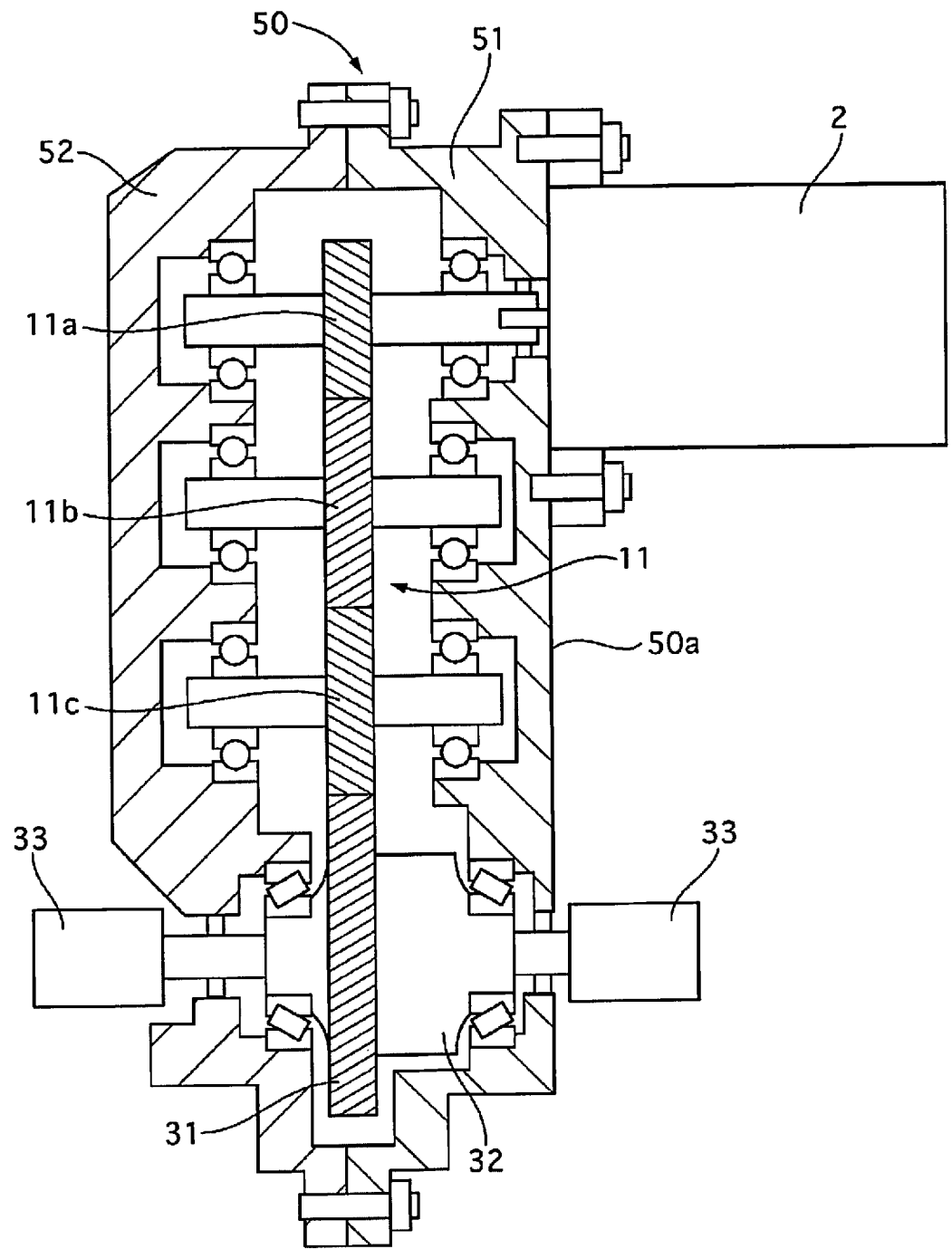
FIG. 4 is a partially enlarged cross-sectional view of the portion accommodating the power transmission mechanism in the hybrid vehicle drive device of the first embodiment.

FIG. 4 is a partially enlarged cross-sectional view of the portion accommodating the power transmission mechanism in the hybrid vehicle drive device of the first embodiment. The transaxle case 50 is configured from a converter housing 51 that houses the torque converter T/C and from a transmission case 52 that houses the continuously variable transmission 4, etc. At this time, the second, third, and fourth gears 11a, 11b, 11c, which configure the power transmission mechanism 11, are accommodated between the converter housing 51 and the transmission case 52. As a result, mounting the electric motor 2 without providing a deceleration mechanism, etc., on the mounting surface 50a side is possible, and the dimensions of the electric motor 2 in the axial direction can be increased in size by securing a space between the engine exhaust pipe 1a and the mounting surface 50a.

In the first embodiment, the power transmission mechanism 11 is configured to be a mechanism having a gear with two or more axes, so that the distance between the drive shaft 33 and the rotating shaft of the electric motor 2 can be increased efficiently. Since the power transmission mechanism 11 is a deceleration mechanism, amplifying the torque of the electric motor 2 becomes possible, and this facilitates the securing of the drive force at the starting time and the securing of the drive force during the acceleration necessary for a vehicle.

The electric motor 2 is disposed above the rotational axis of the drive shaft 33, with the transaxle case 50 in a vehicle-mounted state. In other words, when viewed from the top surface of the vehicle, the rotational axis of the drive shaft 33 is disposed in a position overlapping the projection plane of the electric motor 2 below the vehicle. That is, when securing the inter-axial distance of the drive shaft 33 and the rotating shaft of the electric motor 2 using the power transmission mechanism 11, reducing the overall size of the drive device, as viewed from the top surface of the vehicle, becomes possible by disposing this device above the drive shaft 33, and providing an overall compact drive device, even if the size of the electric motor 2 is increased, is possible.

Returning to FIG. 3, the effects of the first embodiment will be described. The first gear 9a, which is on the same axis as the clutch CL, is disposed between the primary pulley 6 and the final reduction gear device 30, and the power transmission mechanism 11 is disposed on the opposite side of the rotational direction of the final reduction gear device 30 when moving forward. In other words, the power transmission mechanism 11 and the first gear 9a are disposed in order toward the rotational direction of the final reduction gear 31 when moving forward.

The rotational axis of the fourth gear 11c (the second rotary element) of the power transmission mechanism 11 is defined as axis O1; the rotational axis of the second gear 11a (the first rotary element) is defined as axis O2; and a straight line that passes axis O1 and axis O2 is defined as line L1. At this time, the power transmission mechanism 11 is disposed so that, when viewed from the rotational axis direction of each gear, the line L1 is inclined to the first gear 9a side in relation to the vertical direction of the vehicle when mounted to a vehicle. More specifically, the power transmission mechanism 11 is disposed so as to overlap (overlap) the final reduction gear device 30 and the first gear 9a (or the clutch CL) when viewed from the top surface of the vehicle.

The hatched area in FIG. 3 represents the lubricant 100. In this manner, the lubricant 100 is stored in the lower part inside of the transaxle case 50, and each rotary element scrapes up the lubricant 100 and provides the lubricant 100 to the meshing portion on the upper part, etc. Let us assume that, upon adding the power transmission mechanism 11, the line L1 is inclined to the opposite side of the first gear 9a. At this time, the lubricant 100, after being scraped up by the final reduction gear 31 and provided to the power transmission mechanism 11, will fall without being supplied to the first gear 9a; as a result, supplying sufficient lubricant to the first gear 9a and the clutch CL becomes difficult.

That is, the meshing position of the first gear 9a in relation to the final reduction gear 31 is downstream of the meshing position of the fourth gear 11c in relation to the final reduction gear 31 in the rotational direction of the final reduction gear 31. Thus, most of the lubricant 100 that is scraped up by the final reduction gear 31 is used for lubricating the power transmission mechanism 11; only a small amount of the lubricant that remains on the tooth surface of the final reduction gear 31 after the final reduction gear 31 and the fourth gear 11c have meshed will be provided to the first gear 9a.

Therefore, the first embodiment is configured so that the axis L1 is inclined to the first gear 9a side upon disposing the power transmission mechanism 11; in addition, a first inner wall 50b and a second inner wall 50c are formed on the inner wall of the transaxle case 50 along the power transmission mechanism 11, and an oil passage that is able to introduce lubricant is formed between the power transmission mechanism 11 and the inner wall of the transaxle case 50. As a result, the lubricant 100 that is scraped up by the final reduction gear 31 can be dropped onto the first gear 9a after being supplied to each rotary element of the power transmission mechanism 11, and sufficient lubricant 100 can be supplied to the first gear 9a and the clutch CL, as illustrated by the bold, dotted line that ends in an arrow in FIG. 3.

As described above, the effects listed below can be obtained with the first embodiment.

(1) The present invention comprises: a continuously variable transmission 4 (a transmission) that is coupled to an engine output shaft of an engine 1;

a clutch CL that is coupled to a transmission output shaft of the continuously variable transmission 4;

a first gear 9a that is coupled to a clutch output shaft of the clutch CL;

a final reduction gear 31 that constantly meshes with the first gear 9a;

a drive shaft 33 that is coupled to the final reduction gear 31; and a power transmission mechanism 11 having a second gear 11a (a first rotary element) that is coupled to an electric motor 2 (an electric motor) and a fourth gear 11c (a second rotary element) that meshes with the final reduction gear 31 and rotates in response to the rotation of the second gear 11a;

wherein the power transmission mechanism 11 is disposed so that, when viewed from the rotational axis direction of each gear, a line L1 that connects a rotational axis O1 of the second gear 11a and a rotational axis O2 of the fourth gear 11c is inclined to the first gear 9a side in relation to the vertical direction of the vehicle when mounted to a vehicle.

In other words, supplying lubricant that is scraped up by the final reduction gear 31 to the power transmission mechanism 11 becomes possible by constantly meshing the first gear 9a and the power transmission mechanism 11 with the final reduction gear 31. Since the lubricant that is supplied to the power transmission mechanism 11 is also supplied to the first gear 9a by inclining the line L1 to the first gear 9a side, lubricating both the first gear 9a and the power transmission mechanism 11 is possible.

(2) The power transmission mechanism 11 and the first gear 9a are disposed in order toward the rotational direction of the final reduction gear 31 when moving forward.

As a result, the lubricant 100 that is scraped up by the final reduction gear 31 can be dropped onto the first gear 9a after being supplied to each rotary element of the power transmission mechanism 11, and sufficient lubricant 100 can be supplied to the first gear 9a and the clutch CL, as illustrated by the bold dotted line that ends in an arrow in FIG. 3.

(3) The second gear 11a is disposed in a position that overlaps with the first gear 9a when viewed from the top surface of the vehicle.

Thus, efficiently supplying the lubricant 100 that is scraped up by the power transmission mechanism 11 to the first gear 9a and the clutch CL becomes possible.

(4) The transaxle case 50 is configured from a converter housing 51, which becomes the engine side, and a transmission case 52 which becomes the continuously variable transmission side, and the power transmission mechanism 11 is housed between the converter housing 51 and the transmission case 52.

As a result, mounting the electric motor 2 without providing a deceleration mechanism, etc., on the mounting surface 50a side becomes possible, and the dimensions of the electric motor 2 in the axial direction can be increased in size by securing a space between the engine exhaust pipe 1a and the mounting surface 50a. Additionally, since the power transmission mechanism 11 is provided in the transaxle case 50, disposing a deceleration mechanism, etc., in the axial direction upon coupling with the electric motor 2a is not necessary, and space in the axial direction can be secured. Since the inter-axial distance between the second gear 11a and the drive shaft 33 to which the electric motor 2a is coupled is larger than the inter-axial distance between the drive shaft 33 and the first gear 9a, the degree of freedom of the outer diameter of the electric motor 2a becomes high, and the size of the electric motor 2a can be increased. Thus, the drivable vehicle speed range of the vehicle by the electric motor 2a is expanded, improving the fuel economy is possible.

(5) The electric motor 2 is disposed above the rotational axis of the drive shaft 33, with the transaxle case 50 in a vehicle-mounted state. In other words, the rotational axis of the drive shaft 33 is disposed in a position overlapping the electric motor 2, with the transaxle case 50 in a vehicle-mounted state.

That is, when securing the inter-axial distance of the drive shaft 33 and the rotating shaft of the electric motor 2 using the power transmission mechanism 11, reducing the overall size of the drive device, when viewed from the top surface of the vehicle, becomes possible by disposing this device above the drive shaft 33, and providing an overall compact drive device, even if the size of the electric motor 2 is increased, is possible.

The present invention has been described above based on each embodiment; however, the invention is not limited to the configurations described above, and other configurations are included in the present invention.

For instance, in the example described in the embodiment, gears were combined as the power transmission mechanism 11, but the power transmission mechanism is not limited to gears and can be configured from a chain and a sprocket. Also, in the example described in the embodiment, the first gear 9a and the final reduction gear 31 are meshed, and the power transmission mechanism 11 and the final reduction gear 31 are meshed; however, the power transmission mechanism 11 and the first gear 9a may also be meshed.

Additionally, in the example described in the embodiment, an electric motor 2 of a hybrid vehicle is mounted, but the present invention can also be applied when mounting a large generator supplying a drive current to a motor provided to another wheel. Also, an example of an electric motor was described, but the present invention can be applied when providing a transfer as in a four-wheel drive unit.

In the hybrid vehicle of the first embodiment, an example was described in which a continuously variable transmission 4 is mounted; however, the present invention is not limited to a continuously variable transmission 4 and may be another, stepped transmission. A planetary gear mechanism comprising a plurality of frictional engagement elements can be mounted in place of the clutch CL, and a sub-transmission that is able to appropriately shift gears can also be mounted.

Furthermore, in the configuration described in the embodiment, the engine is restarted by a starter motor 3, but other configurations are also possible. Specifically, in recent years, a technology has been put into practical use, in which the alternator is replaced with a motor generator in a vehicle with an idling stop function, and an alternator function is added to this motor generator to add an engine starting function; as a result, when restarting the engine from an idling stop, the engine is restarted by this motor generator, rather than by the starter motor. The present invention may be configured so that engine is restarted by a motor generator described above.

The invention claimed is:

1. A hybrid vehicle drive device, comprising:
a transmission coupled to an engine output shaft of an engine;
a clutch coupled to a transmission output shaft of a transmission;
a first gear coupled to a clutch output shaft of the clutch;
a final reduction gear that constantly meshes with the first gear;
a drive shaft coupled to the final reduction gear; and
a power transmission mechanism having a first rotary element coupled to an electric motor and a second rotary element configured to mesh with the final reduction gear and rotate in response to the rotation of the first rotary element, the final reduction gear meshing with the first gear, on the opposite side of a vertical axis through a rotational axis of the final reduction gear;
the power transmission mechanism being disposed so that, when viewed from the rotational axis direction of each gear, a line that connects a rotational axis of the first rotary element and a rotational axis of the second rotary element is inclined to the first gear side in relation to a vertical direction of a vehicle in a state when the power transmission mechanism is mounted to the vehicle.

2. The hybrid vehicle drive device recited in claim 1, wherein
the first gear is disposed downstream of the power transmission mechanism in the rotational direction of the final reduction gear with respect to a lubricant supply path.

3. The hybrid vehicle drive device recited in claim 2, wherein
the first rotary element is disposed in a position overlapping the first gear, when viewed from a top surface of the vehicle.

4. The hybrid vehicle drive device recited in claim 2, further comprising
a transaxle case formed from a converter housing on an engine side of the transaxle case, and a transmission case on a continuously variable transmission side of the transaxle case, and
the power transmission mechanism being housed between the converter housing and the transmission case.

5. The hybrid vehicle drive device recited in claim 1, wherein
the first rotary element is disposed in a position overlapping the first gear, when viewed from a top surface of the vehicle.

6. The hybrid vehicle drive device recited in claim 5, further comprising a transaxle case formed from a converter housing on an engine side of the transaxle case, and a transmission case on a continuously variable transmission side of the transaxle case, and the power transmission mechanism being housed between the converter housing and the transmission case.

7. The hybrid vehicle drive device recited in claim 1, further comprising a transaxle case formed from a converter housing on an engine side of the transaxle case, and a transmission case on a continuously variable transmission side of the transaxle case, and the power transmission mechanism being housed between the converter housing and the transmission case.

8. The hybrid vehicle drive device recited in claim 7, wherein the electric motor is disposed above a rotational axis of the drive shaft, with the transaxle case in a vehicle-mounted state.

9. The hybrid vehicle drive device recited in claim 8, wherein the rotational axis of the drive shaft is disposed in a position overlapping the electric motor, with the transaxle case in the vehicle-mounted state.

10. The hybrid vehicle drive device recited in claim 7, wherein a rotational axis of the drive shaft is disposed in a position overlapping the electric motor, with the transaxle case in a vehicle-mounted state.

* * * * *